(12) United States Patent  
Sekiguchi (10) Patent No.: US 9,456,173 B2
(45) Date of Patent: Sep. 27, 2016

(54) RECORDING APPARATUS AND RECORDING METHOD (71) Applicant: CANON KABUSHIKI KAISHA, Tokyo (JP)

(72) Inventor: Tomohiro Sekiguchi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 120 days.

(21) Appl. No.: 14/341,119

(22) Filed: Jul. 25, 2014

(65) Prior Publication Data

US 2015/0036995 A1   Feb. 5, 2015

(30) Foreign Application Priority Data

Jul. 30, 2013   (JP) ................... 2013-158273

(51) Int. Cl.
H04N 5/77   (2006.01)
H04N 5/907   (2006.01)
H04N 9/804   (2006.01)

(52) U.S. Cl.
CPC .............. H04N 5/772 (2013.01); H04N 5/907 (2013.01); H04N 9/8045 (2013.01)

(58) Field of Classification Search
CPC ..... H04N 5/772; H04N 5/907; H04N 9/8045
USPC .............. 386/224, 226, 248, 265; 348/222.1, 348/231.2; 396/265
See application file for complete search history.

(56) References Cited

U.S. PATENT DOCUMENTS

| | | | | |
|---|---|---|---|---|
| 6,606,448 B1* | 8/2003 | Terauchi | ................... | H04N 5/76 348/152 |
| 2005/0259163 A1* | 11/2005 | Tsujii | ..................... | H04N 5/772 348/231.2 |
| 2007/0031139 A1* | 2/2007 | Tsukuda | .................. | H04N 5/232 396/265 |
| 2007/0177809 A1* | 8/2007 | Takahashi | .............. | H04N 5/232 382/232 |
| 2008/0246858 A1* | 10/2008 | Omori | ................. | H04N 5/23245 348/231.99 |
| 2009/0290044 A1* | 11/2009 | Yoshino | ............... | H04N 1/2112 348/231.2 |
| 2010/0092157 A1* | 4/2010 | Yoshimura | ............. | H04N 5/772 386/338 |
| 2010/0115185 A1* | 5/2010 | Ono | ..................... | G06F 12/0246 711/103 |
| 2010/0134654 A1* | 6/2010 | Tsuda | .................... | H04N 1/2112 348/231.1 |

(Continued)

FOREIGN PATENT DOCUMENTS

JP   2012-080340 A   4/2012

OTHER PUBLICATIONS

The above references were cited in a Great Britain Search Report issued on Feb. 13, 2015, which is enclosed, that issued in the corresponding Great Britain Patent Application No. GB1413295.5.

Primary Examiner — Thai Tran
Assistant Examiner — Stephen Smith
(74) Attorney, Agent, or Firm — Cowan, Liebowitz & Latman, P.C.

(57) ABSTRACT

There is a first writing mode in which data is written to a recording medium in a first recording unit, and a second writing mode in which data is written in a second recording unit whose size is greater than the first recording unit. In an interval recording mode in which a predetermined recording time worth of moving image data is repeatedly recorded each time a predetermined interval period elapses, moving image data is recorded to the recording medium in the first writing mode having the smaller recording unit. This makes it possible to effectively use the recording area of the recording medium in the case where moving image data obtained by interval shooting is recorded to the recording medium.

9 Claims, 6 Drawing Sheets (56) References Cited

U.S. PATENT DOCUMENTS

2010/0134655 A1* 6/2010 Kuroiwa .............. H04N 1/2112
                                                          348/231.2
2011/0125981 A1* 5/2011 Miomo .................. H04N 5/772
                                                          711/173
2011/0193994 A1* 8/2011 Nozawa ................. H04N 5/772
                                                          348/231.3
2011/0199504 A1* 8/2011 Oka ................... H04N 5/23241
                                                          348/222.1
2011/0242360 A1* 10/2011 Mori ...................... H04N 5/772
                                                          348/231.1
2013/0329083 A1* 12/2013 Sakamoto .......... H04N 5/23229
                                                          348/231.7

* cited by examiner

RECORDING APPARATUS AND RECORDING METHOD

BACKGROUND OF THE INVENTION

1. Field of the Invention

The present invention relates to a recording apparatus and a recording method, and in particular relates to a recording apparatus capable of interval recording and a recording method.

2. Description of the Related Art

There is a conventionally known recording apparatus that shoots a moving image and records it on a recording medium such as a memory card. One example of this type of recording apparatus has an interval shooting function for shooting a moving image for a certain time (number of frames) at a predetermined time interval (see Japanese Patent Laid-Open No. 2012-80340).

With an SD memory card, which is one type of memory card, it is possible to perform writing in units of a recording unit (RU), which is the minimum writing unit, and also perform writing in units of an allocation unit (AU), whose size is an integral multiple of the size of the RU. Data can be written at a higher speed when performing writing in AU units than when performing writing in RU units.

There are cases where moving image data has a higher data rate than still picture data, and even with moving image data obtained by interval shooting, writing is performed in AU units similarly to the case of performing normal moving image shooting. However, since the shooting time for each instance in interval shooting is generally short, the size of the obtained moving image data piece is often smaller than the size of the AU, and an unused area will remain in an AU. However, the moving image data obtained in the next instance of the interval shooting will be written into an unused AU, thus resulting in the unused area of the previously recorded AU being wasted.

The present invention addresses this issue in conventional technology, and provides a recording apparatus that can effectively use the recording area of a recording medium in the case where moving image data obtained by interval shooting is recorded to the recording medium, and a recording method.

SUMMARY OF THE INVENTION

According to one aspect of the present invention, there is provided a recording apparatus comprising: a recording unit that records moving image data to a recording medium; and a control unit that selects one of a first writing mode in which the recording unit instructs to write data to the recording medium in a first writing unit of the recording medium, and a second writing mode in which the recording unit instructs to write data to the recording medium in a second writing unit whose size is greater than the first writing unit, and controls the recording unit so as to write the moving image data to the recording medium in accordance with the selected writing mode, wherein the control unit selects the first writing mode in an interval recording mode in which a predetermined recording time worth of moving image data is repeatedly recorded each time a predetermined interval period elapses, and controls the recording unit so as to record moving image data to the recording medium in accordance with the first writing mode in the interval recording mode.

According to another aspect of the present invention, there is provided a recording method comprising: controlling a recording operation according to a recording mode including a first writing mode in which data is written in a first writing unit and a second writing mode in which data is written in a second writing unit whose size is greater than the first recording unit, wherein in the controlling step comprises, selecting, if the recording mode is an interval recording mode in which a predetermined recording time worth of moving image data is repeatedly recorded each time a predetermined interval period elapses, the first writing mode in which data is written to the recording medium in the first writing unit, and controlling the recording operation so as to record moving image data to the recording medium in accordance with the first writing mode in the interval recording mode.

Further features of the present invention will become apparent from the following description of exemplary embodiments with reference to the attached drawings.

DESCRIPTION OF THE EMBODIMENTS

Exemplary embodiments of the present invention will now be described in detail in accordance with the accompanying drawings.

First Embodiment

Figure 1:
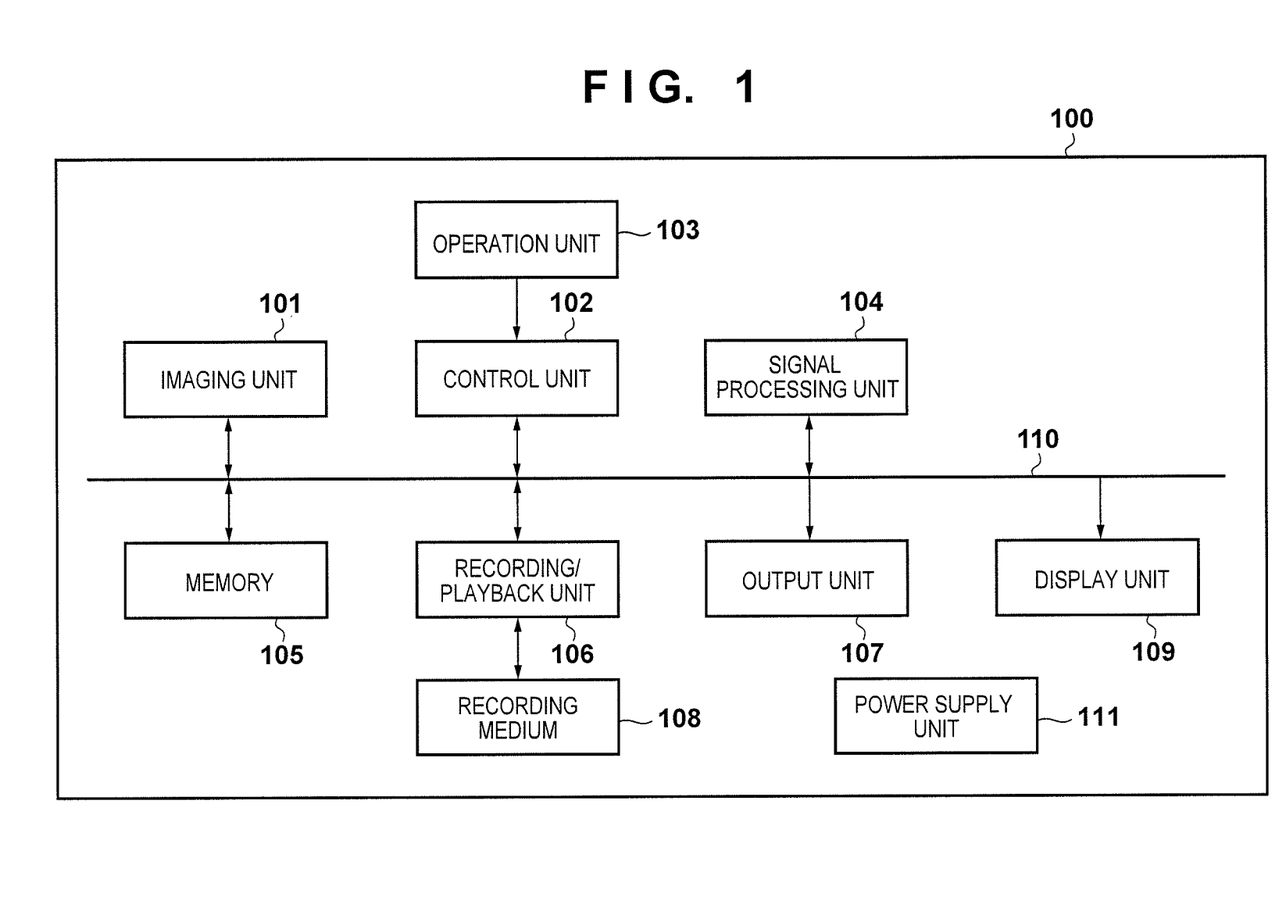
FIG. 1 is a block diagram showing an example of a configuration of a digital camera as one example of a recording apparatus according to an embodiment of the present invention.

FIG. 1 is a block diagram showing an example of the configuration of a digital camera 100 as one example of a recording apparatus according to an embodiment of the present invention. Examples of the recording apparatus according to the present embodiment include not only an imaging apparatus, but also any electronic device that can record moving images obtained by interval shooting performed by an internal or connected camera. Examples of such an electronic device include a mobile phone, a tablet terminal, a game console, a personal computer, a navigation system, and an appliance.

As shown in FIG. 1, an imaging unit 101 has an optical system, an imaging device, and the like, and outputs moving image data obtained by shooting a subject. Note that although the imaging unit 101 of the present embodiment outputs moving image data having 1920 pixels horizontally× 1080 pixels vertically and a frame rate of 30 frames per second, the moving image data may have another number of pixels and frame rate.

A control unit 102 performs overall control of the operation of the digital camera 100 according to input from an operation unit 103. The control unit 102 includes a microcomputer (CPU), a memory, and the like, and controls the digital camera 100 in accordance with a computer program (software) stored on a non-volatile memory (not shown). Also, the control unit 102 has a built-in recording medium interface for the communication of data and commands with a recording/playback unit 106.

The operation unit 103 includes various types of switches, buttons, and the like for a user to perform operations. The operation unit 103 receives various types of instructions and the like from the user and notifies the control unit 102 of them. Also, the operation unit 103 includes a power switch, a switch for instructing the start, stop, etc. of moving image data recording, a switch for switching the operation mode of the digital camera 100, a switch for operating menu screens, and the like.

When recording is performed, a signal processing unit 104 encodes moving image data acquired by the imaging unit 101 into a known encoding format such as MPEG so as to compresses the quantity of information. Also, when playback is performed, the signal processing unit 104 decodes moving image data read out from a recording medium 108 so as to expand the quantity of information.

A memory 105 temporarily stores moving image data acquired by the imaging unit 101, moving image data read out from the recording medium 108, and the like. Various function blocks of the digital camera 100 process the moving image data by accessing it in the memory 105. Also, besides moving image data, the memory 105 stores various types of information such as file system information and management information, and furthermore plays the role of a work memory or the like for when the control unit 102 executes programs.

The recording/playback unit 106 writes and reads moving image data and various types of information to/from the recording medium 108. When performing recording, the recording/playback unit 106 reads out moving image data stored in the memory 105, and writes it to the recording medium 108. Also, when performing playback, the recording/playback unit 106 reads out moving image data and audio data from the recording medium 108 and stores it in the memory 105. In the present embodiment, an SD memory card is used as the recording medium 108 that has recording modes with different minimum recording units, but there is no particular limitation on the medium format, and it is possible to use a general recording medium such as a hard disk (HDD) or a memory card of another standard. An SD memory card has a flash memory, which is a non-volatile memory for storing data, and a controller for controlling the writing and reading of data to/from the flash memory.

Also, moving image data and various types of information that are to be recorded to the recording medium 108 are managed as files by the recording/playback unit 106 in accordance with a file system such as the FAT (File Allocation Table) file system. Furthermore, although the recording medium 108 is configured so as to be able to be mounted to and ejected from the digital camera 100 using a mounting and ejecting mechanism (not shown), a configuration is possible in which the recording medium 108 is built into the digital camera 100.

In the case where a moving image file including moving image data is to be read from or written to the recording medium 108, the control unit 102 controls the recording/playback unit 106 so as to read out file system data (management data) such as the FAT and directory information from the recording medium 108, and stores it in the memory 105. This file system data is data that indicates the file names, file sizes, data recording addresses, and the like of data recorded on the recording medium 108, and is information for managing files. Also, the control unit 102 controls the writing and reading of files in accordance with the readout file system data. The control unit 102 updates the file system data stored in the memory 105 in response to the writing of files to the recording medium 108. The updated file system data is then recorded on the recording medium 108 by the recording/playback unit 106 at a predetermined timing.

Also, an output unit 107 outputs played back moving image data to a display apparatus or the like outside the digital camera 100. A display unit 109 displays moving images and various types of information on a display apparatus such as a liquid crystal panel. A data bus 110 is used for the transmission and reception of data, various types of control commands, and the like between the function blocks of the digital camera 100. A power supply unit 111 supplies power received from a power supply such as a battery (not shown) to the function blocks of the digital camera 100. The control unit 102 of the present embodiment can control whether or not power is to be supplied from the power supply unit 111 to each of the function blocks of the digital camera 100.

The following describes modes for writing data to the recording medium 108 in the digital camera 100 of the present embodiment. The digital camera 100 of the present embodiment has a normal writing mode (first writing mode) in which data is written to the recording medium 108 in cluster units regardless of the SD speed class. The digital camera 100 also has a high-speed writing mode (second writing mode) in which data is written in AU units in accordance with the SD speed class. It should be noted that these writing modes are different from the normal (DS) mode and the high-speed (HS) mode of SD memory cards.

In the high-speed writing mode, the recording unit is an allocation unit (AU), whose size is an integral multiple of the size of a recording unit (RU), which is the minimum writing unit determined by the SD speed class. The size of the RU is an integral multiple of 16 KB, and is prescribed as the minimum size that corresponds to the speed class. Information regarding the AU and the RU is recorded on the SD memory card as card information (SD status), and thus can be acquired from the SD memory card when power is introduced or at any time.

Note that when reading or writing data to an SD memory card, the cluster size, which is the unit of management in the file system, and the RU size are generally the same, and the RU will be considered to be a cluster in the following description. It should be noted that the AU in an SD memory card is different from an allocation unit that is synonymous with a cluster in the FAT file system. Also, although a SD memory card has a prescribed speed class for guaranteeing the minimum write speed, the minimum write speed is guaranteed based on the premise of performing recording in AU units, and therefore writing in AU units can also be called writing in accordance with the speed class.

In the high-speed writing mode, data writing is performed after designating, from among the AUs of the recording medium 108, AUs whose cluster usage rate is zero, that is to say AUs in which all of the clusters making up the AU are empty. Specifically, the recording/playback unit 106 designates an address that is to be the head of an AU, issues a writing command to the recording medium 108 for writing data beginning at the designated address, and also transmits data. In this way, in the high-speed writing mode, data writing is performed in units of an AU, which is an area made up of a predetermined number of consecutive clusters, thus making it possible to perform high-speed data writing. However, if the amount of data to be written cannot be divided evenly according to the AU size, data writing will end in a state in which only a portion of the clusters in an AU are used, and the remaining unused clusters will not be used in subsequent writing, thus being wasted.

In contrast, in the normal writing mode, the digital camera 100 uses the cluster, which is the recording unit of the recording medium 108, as the unit of data writing. Specifically, the recording/playback unit 106 designates an address that is to be the head of a cluster, issues a writing command to the recording medium 108 for writing data beginning at the designated address, and also transmits data. Since data writing is performed in cluster units in the normal writing mode, the data writing speed is slower than in the high-speed writing mode, but clusters can be used without being wasted.

Specifically, in the case where one AU is made up of N clusters, in order to write one AU worth (N clusters worth) of data in the high-speed writing mode, the recording/playback unit 106 designates an AU head address and transmits a writing command to the recording medium 108 one time. In contrast, in order to write the same N clusters worth of data in the normal writing mode, the recording/playback unit 106 transmits a writing command to the recording medium 108 N times. For this reason, time is required to receive a response to the writing command from the recording medium 108 in the normal writing mode.

The digital camera 100 of the present embodiment has a normal recording mode and an interval recording mode as recording modes. In the interval recording mode, an operation for capturing and recording a set recording time (number of frames) worth of moving image data is performed each time a predetermined interval period elapses. The user can set the normal recording mode or the interval recording mode by operating the operation unit 103. Although the recording time is 0.5 seconds in the interval recording mode of the present embodiment, this is simply one example, and the recording time may be another time, or may be able to be set by the user.

Also, the user can set the interval period by selecting one of multiple interval periods that have been prepared in advance. For example, 5 seconds, 10 seconds, 30 seconds, 1 minute, 10 minutes, and 1 hour are prepared as interval periods, and the user selects one of these interval periods. The user can furthermore set the number of times that recording is to be repeated in the interval recording mode. The control unit 102 stores information indicating the set interval period and recording repetition number in the memory 105.

Also, the digital camera 100 of the present embodiment records each piece of moving image data obtained in one instance of recording in the interval recording mode as a separate moving image file. This is done in order to suppress the power consumption of the digital camera 100 by interrupting the supply of power to unneeded blocks during standby until the start of the next recording, thus making it possible to perform interval recording for an extended period of time even in the battery-driven state. For this reason, if interval recording has been carried out with the recording repetition number 100 for example, 100 moving image files will be recorded on the recording medium 108. Note that a certain amount of time is required to be able to start interval recording again after one instance of interval recording ends and the power supply is interrupted, and the power supply is not cut off if the recording interval (interval period) that was set is shorter than that amount of time. Note that in this case as well, separate moving image files may be recorded for each instance of interval recording in order to reliably record captured moving image data.

The digital camera 100 of the present embodiment also has a function by which the pieces of moving image data stored in multiple moving image files that were recorded on the recording medium 108 in a series of interval recording are concatenated and recorded as one moving image file on the recording medium 108. Details of this concatenation function will be described later.

Also, the digital camera 100 of the present embodiment changes mode for writing data to the recording medium 108 between the normal recording mode (recording mode other than the interval recording mode) and the interval recording mode.

Figure 2:
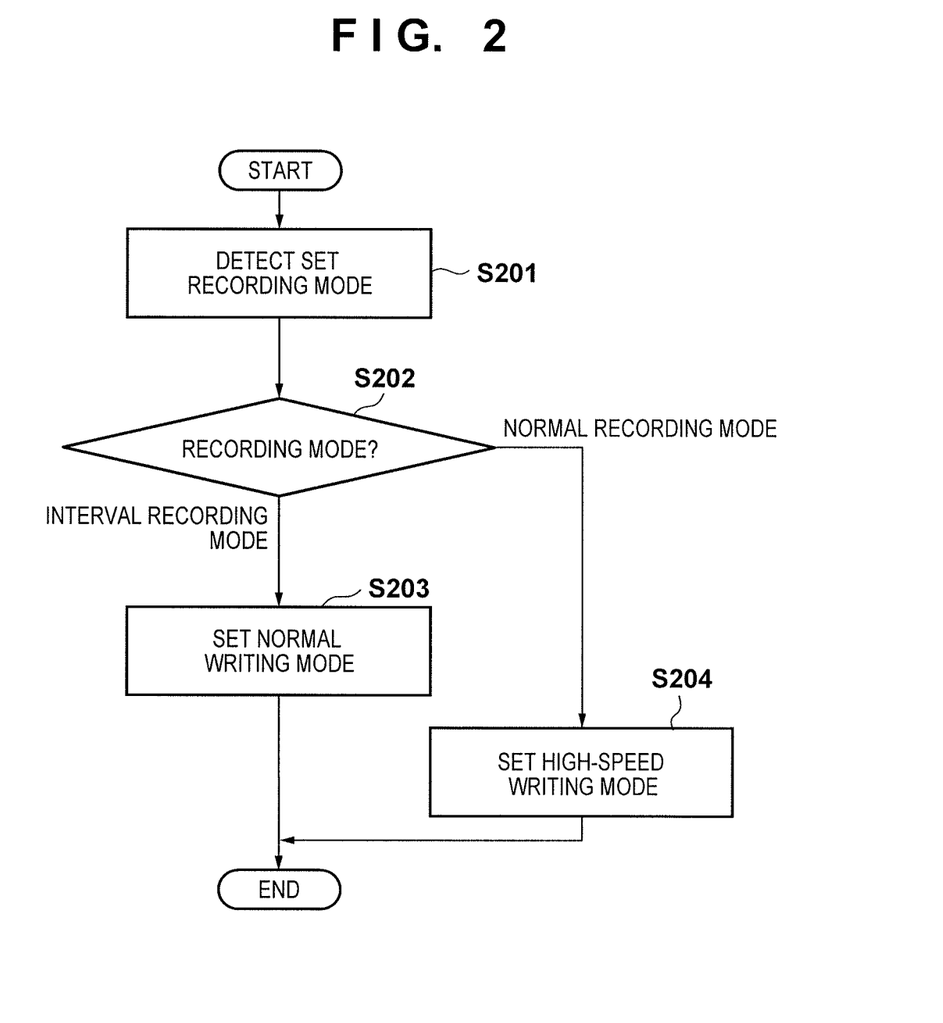
FIG. 2 is a flowchart showing writing mode setting processing according to a first embodiment.

FIG. 2 is a flowchart showing a flow of processing for setting the writing mode of the recording medium 108, which is executed by the control unit 102. In the case where the user has set either the normal recording mode or the interval recording mode by operating the operation unit 103 for example, the control unit 102 detects the recording mode that was set by the user (step S201). Next, the control unit 102 determines whether the set recording mode is the normal recording mode or the interval recording mode (step S202). If the determination result is the interval recording mode, the control unit 102 sets the normal writing mode as the mode for writing data to the recording medium 108 (step S203). Also, if the determination result is the normal recording mode, the control unit 102 sets the high-speed writing mode as the mode for writing data to the recording medium 108 (step S204).

This relationship can be summarized as follows.

| Recording mode | Writing mode |
| --- | --- |
| Normal recording mode | High-speed writing mode (AU units) |
| Interval recording mode | Normal writing mode (cluster units) |

The following describes recording operations of the digital camera 100 of the present embodiment, beginning with recording processing in the normal recording mode. When the recording medium 108 is newly mounted, or the digital camera 100 is powered on, the control unit 102 generates an AU table, which is information indicating the FAT clusters that correspond to each AU and their usage status, and stores the generated AU table in the memory 105. Specifically, based on the information read out from the recording medium 108, the control unit 102 detects the size of one cluster making up an AU based on the size of one AU and the number of clusters making it up. The control unit 102 then determines the FAT clusters that correspond to each AU based on the AU size, the cluster size, and the FAT. The AU table, which is information indicating information for specifying the corresponding FAT clusters (e.g., cluster numbers) for each AU and their usage status, is generated and stored in the memory 105. For example, in the case where an AU is made up of four clusters, and the size of the clusters making up the AU is equal to the FAT cluster size, four FAT cluster numbers can be stored in association with each AU in the AU table. The usage status of each cluster may be determined by referencing the FAT, or may be included in the table.

Upon receiving an instruction for moving to the moving image data recording mode from the operation unit 103 for example, the control unit 102 moves the digital camera 100 to the recording standby state, and waits for an instruction to start recording. The control unit 102 then executes a live-view display operation in the recording standby state, in which moving image shooting is performed with the imaging unit 101, and the obtained moving image is displayed on the display unit 109. When an instruction to start recording is input from the operation unit 103, the control unit 102 controls the signal processing unit 104 so as to read out moving image data that was input by the imaging unit 101 and stored in the memory 105, and start the encoding of the moving image data. The signal processing unit 104 stores the encoded data in the memory 105 again.

In the present embodiment, the rate of the encoded moving image data obtained by the signal processing unit 104 (amount of data generated per unit of time) is lower than the recording data rate of the recording medium 108 (amount of data written per unit of time). The encoded data therefore accumulates as it is stored in the memory 105. Each time the amount of encoded data stored in the memory 105 reaches a first predetermined amount, the recording/playback unit 106 reads out the encoded data from the memory 105 and records it to the recording medium 108. Also, if the amount of encoded data stored in the memory 105 falls to a second predetermined amount that is lower than the first predetermined amount, the recording/playback unit 106 temporarily stops the readout of encoded data from the memory 105, and interrupts the processing of recording to the recording medium 108. In this way, the recording/playback unit 106 intermittently executes recording according to the amount of encoded data accumulated in the memory 105. Note that if a file is not open when encoded data is to be recorded on the recording medium 108, the recording/playback unit 106 creates and opens a new file for recording encoded data, and records the encoded data as a moving image file.

The control unit 102 controls the recording/playback unit 106 so as to write moving image data obtained in the normal recording mode to the recording medium 108 in the high-speed writing mode. The control unit 102 controls the recording/playback unit 106 so as to write data after, based on the AU table stored in the memory 105, designating the address of the head cluster of the AU to be recorded in next from among the empty AUs, that is to say the AUs whose clusters making them up are all empty. Accordingly, the recording/playback unit 106 designates the head address of the unrecorded AU that was designated in this way, transmits a writing command to the recording medium 108, and reads out writing target data from the memory 105 and transmits it to the recording medium 108. The controller built into the recording medium 108 writes the received data to the built-in flash memory beginning at the address designated by the writing command. Each time one instance of writing to the recording medium 108 is finished, the control unit 102 updates the file system data (management information) stored in the memory 105 based on the recording position of the encoded data that was written at that time and the like. The control unit 102 then controls the recording/playback unit 106 so as to read out the updated file system data from the memory 105 and record it to the recording medium. When one instance of writing is finished, the control unit 102 also updates the AU table stored in the memory 105.

Also, if an instruction to stop recording is received from the operation unit 103 during moving image recording, the control unit 102 stops the encoding of moving image data performed by the signal processing unit 104, and closes the file undergoing recording by the recording/playback unit 106. The control unit 102 also updates the content of the file system data and records it to the recording medium 108 using the recording/playback unit 106. At this time, even if an empty area remains in the AU in which moving image data was being written when the recording was stopped (the last-recorded AU), data will be recorded to an unrecorded AU in the next instance of recording, and therefore the empty area in the last-recorded AU will be wasted.

Figure 3:
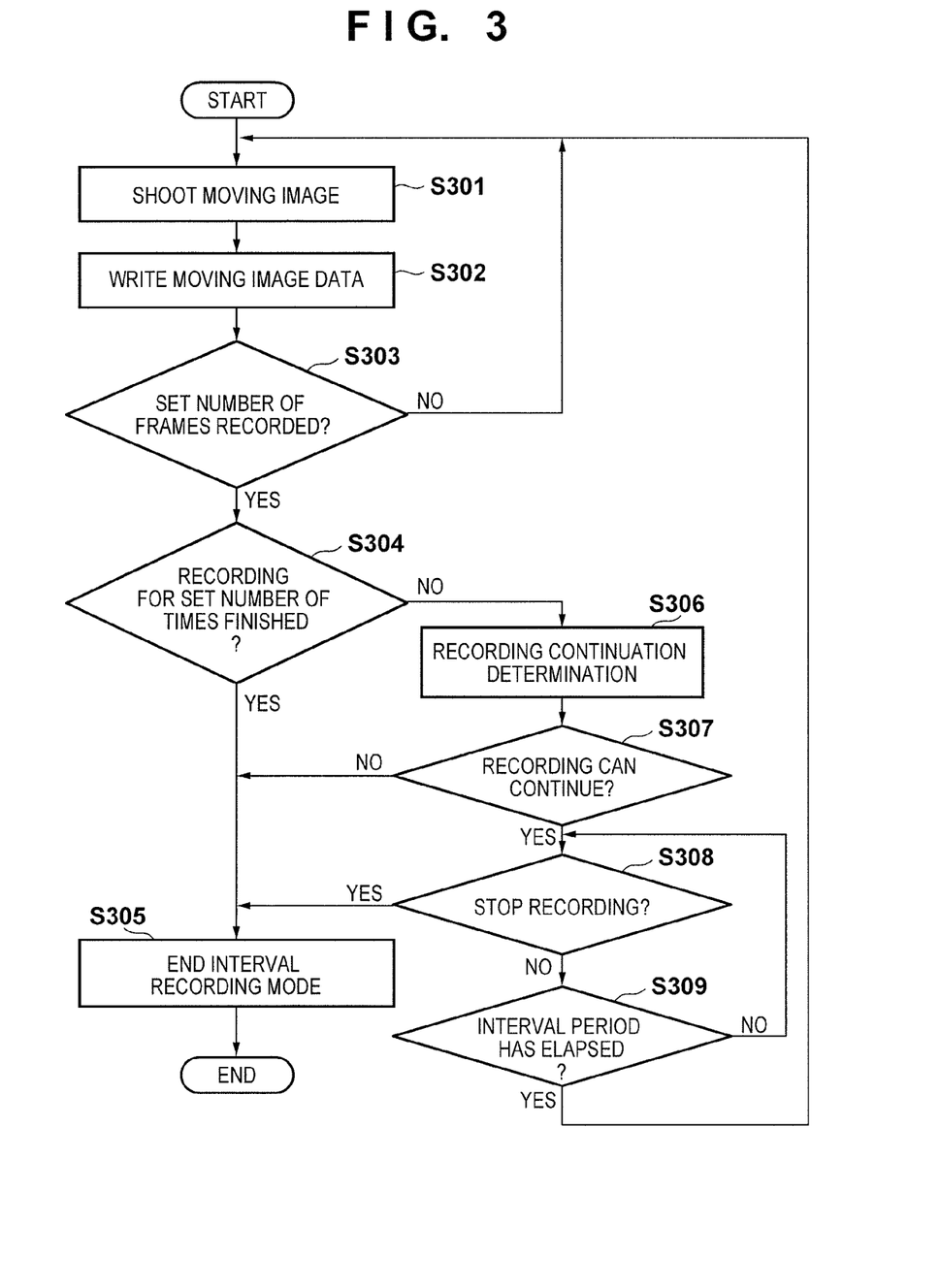
FIG. 3 is a flowchart showing processing in an interval recording mode according to the first embodiment.

Next, processing for recording in the interval recording mode will be described. FIG. 3 is a flowchart showing processing in the interval recording mode. Note that the processing in FIG. 3 is executed by the control unit 102 controlling various units.

After the interval recording mode has been set, the processing of FIG. 3 is started if an instruction to start recording is received from the operation unit 103 in the recording standby state. Note that an instruction from the operation unit 103 is not necessary in another embodiment in which it is possible to designate a start time for interval recording (a specific time or the elapse of a predetermined time period).

The control unit 102 controls the imaging unit 101 so as to perform moving image shooting (step S301). Next, the control unit 102 controls the signal processing unit 104 so as to encode the moving image data and temporarily store the encoded data in the memory 105, and then controls the recording/playback unit 106 so as to read out the moving image data from the memory 105 and write it to the recording medium 108 (step S302). At this time, the control unit 102 detects empty clusters based on the FAT that was read out from the recording medium 108. The control unit 108 then controls the recording/playback unit 106 so as to write the data to the empty clusters of the recording medium 108 in the normal writing mode (in cluster units).

Next, the control unit 102 determines whether or not the shooting and recording of one set recording time (number of frames) worth of moving image data is finished (step S303), and repeats the processing from step S301 until the recording of one recording time worth of moving image data is finished. Also, as previously described, one recording time worth of moving image data is recorded as one moving image file in the interval recording mode. When the recording of one recording time worth of moving image data is finished, the control unit 102 stops the supply of power from the power supply unit 111 to the imaging unit 101, the signal processing unit 104, and the recording/playback unit 106. This makes it possible to reduce power consumption in the interval period.

When the recording of one recording time worth of moving image data is finished, the control unit 102 determines whether or not recording for the set number of repetitions is finished (step S304). If recording for the set number of times is finished, the control unit 102 ends the interval recording mode (step S305).

Also, if recording for the set number of times is not finished, the control unit 102 determines whether or not recording in the interval recording mode can be continued (step S306). The control unit 102 first calculates the amount of moving image data that is to be recorded in the next instance of recording (next data amount). For example, letting the data rate of the encoded moving image data be a predetermined value, the control unit 102 obtains the next data amount by multiplying the predetermined value by the number frames (15 frames in the present embodiment) in the recording time for one instance (0.5 seconds in the present embodiment). Also, since the normal writing mode of the recording medium 108 is used in the interval recording mode in the present embodiment, the moving image data is recorded in cluster units. The control unit 102 therefore calculates the number of clusters needed in order to record the moving image data that is to be recorded next. The number of clusters can be obtained by dividing the data amount by the cluster size of the recording medium 108 and rounding up to an integer. Next, based on the calculated number of clusters, number of clusters per AU, and number of remaining clusters in the AU that was used immediately previously, the control unit 102 calculates the number of new AUs that would be needed (next data amount) if the moving image data were next recorded in cluster units.

For example, assume that four clusters make up one AU, three is calculated as the number of clusters needed to record the moving image data that is to be recorded next, and one cluster is unused in the AU in which moving image data was last recorded immediately previous (last-recorded AU). In this case, the next moving image data will not fit in the unused cluster of the last-recorded AU, and therefore one new AU will be needed in addition to the last-recorded AU, and the next data amount is 1 [AU].

Next, the control unit 102 obtains the remaining recording capacity of the recording medium 108. In the present embodiment, the number of unrecorded AUs (empty AUs) that do not have recorded clusters among the AUs in the recording medium 108 is detected by the control unit 102 as the remaining recording capacity [AU]. Furthermore, the control unit 102 calculates the next remaining capacity [AU] by subtracting the next data amount [AU] from the remaining recording capacity [AU].

Next, the control unit 102 calculates the amount of moving image data that would be obtained if the one or more moving image data pieces (moving image files) that have been recorded since the start of moving image data recording in the interval recording mode were concatenated with the moving image data that is to be recorded next (i.e., calculates a concatenated data amount). Then, based on the AU size, control unit 102 calculates the number of AUs that would be needed to record the concatenated data amount.

Next, the control unit 102 compares the next remaining capacity (number of AUs) and the next data amount (number of AUs), and determines whether or not the next remaining capacity is greater than or equal to the next data amount. If the next remaining capacity is greater than or equal to the next data amount, the control unit 102 determines that recording can be continued, and if the next remaining capacity is less than the next data amount, the control unit 102 determines that recording cannot be continued.

In this way, if the result of determining whether or not recording can be continued is that recording cannot be continued (No in step S307), the control unit 102 ends the interval recording mode (step S305). On the other hand, if it was determined that recording can be continued (Yes in step S307), the control unit 102 determines whether or not an instruction to stop recording was received from the operation unit 103 (step S308). If an instruction to stop recording was received, the control unit 102 ends the interval recording mode (step S305). If an instruction to stop recording has not been received, the control unit 102 determines based on the time measured by an internal timer whether or not the elapsed time since the immediately previous recording has reached the set interval period (step S309). If the interval period has not elapsed, the procedure returns to step S308, and the processing is repeated. If the interval period has been reached, the control unit 102 returns to step S301 and shoots and records a moving image again.

Note that as previously described, the supply of power to some function blocks is stopped in the interval period. For this reason, the control unit 102 controls the power supply unit 111 so as to start the supply of power to the function blocks at a time that is earlier than the interval period by the amount of time needed for the function blocks to start operating.

Figure 4A:
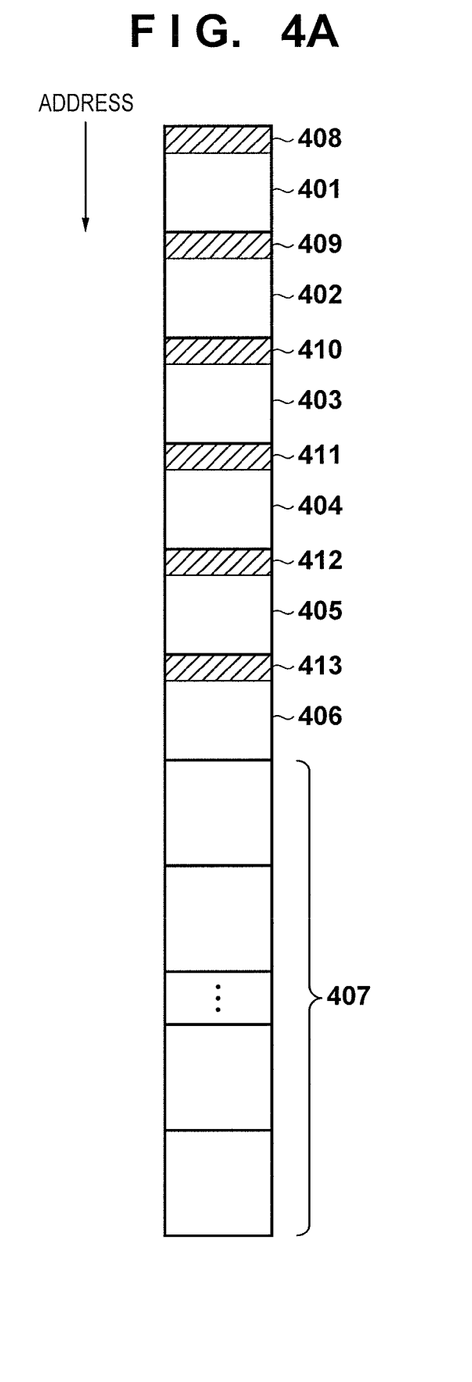
FIGS. 4A and 4B are diagrams schematically showing the positional relationship between recording areas of a recording medium and moving image data that has been recorded.
Figure 4B:
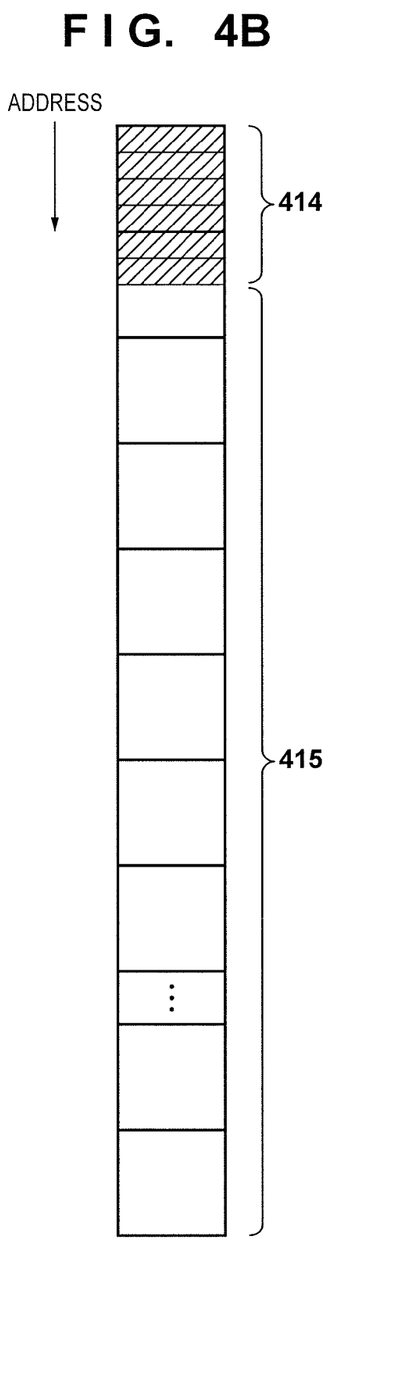

FIGS. 4A and 4B are diagrams schematically showing the positional relationship between recording areas of the recording medium 108 and moving image data that has been recorded. It is assumed that the addresses increase from top to bottom in FIGS. 4A and 4B. In FIG. 4A, 401 to 405 each indicate one AU, and 407 indicates an empty AU group. Assume that the amount of data recorded in one instance of recording in the interval recording mode is lower than the size of one AU, and data was written in the high-speed writing mode. In this case, moving image data has been recorded as shown by 408 to 413 in FIG. 4A after six instances of interval recording. Here, 408 to 413 each indicate moving image data that was recorded in one instance of recording, and although the size of each piece of moving image data is lower than the size of one AU, data writing is performed in units of AUs in the high-speed writing mode, and therefore no data is written in the empty areas of the AUs, and thus the empty areas are wasted.

FIG. 4B schematically shows the arrangement of moving image data that was recorded to the recording medium 108 in the interval recording mode in the present embodiment. In the interval recording mode, data writing is performed in cluster units. For example, in the case where one AU is made up of four clusters, and the amount of moving image data recorded in one instance of recording is one cluster worth of data, the moving image data recorded in six instances of recording will be recorded in the clusters of two consecutive AUs as indicated by 414. A remaining area 415 that includes the unused area of the last-recorded AU is entirely used as an empty area. This makes it possible to reduce wasted recording areas. Note that if recording is performed in the high-speed writing mode next, the unused area of the last-recorded AU will not be used.

Next, processing for joining moving image data pieces that were recorded in the interval recording mode will be described. If a join instruction has been input from the user via the operation unit 103 for example, the control unit 102 instructs the recording/playback unit 106 to play back the moving image files that were recorded on the recording medium 108 in the interval recording mode in order beginning with the moving image file that was recorded first. The recording/playback unit 106 reads out the moving image files that were recorded in the interval recording mode from the recording medium 108 in the order of recording, and transmits them to the signal processing unit 104. The signal processing unit 104 decodes the moving image data of the readout moving image files and temporarily stores the decoded moving image data in the memory 105. In parallel with the decoding, the signal processing unit 104 also successively reads out the decoded image data from the memory 105 and re-encodes the moving image data of multiple decoded moving image files into one continuous piece of moving image data. When joining multiple moving image files, data is re-encoded after being decoded once instead of being joined in the encoded state in order to improve the encoding efficiency at the junction between moving image files and reduce the possibility of obtaining an unnatural result at a junction in decoding processing after the joining.

The control unit 102 then controls the recording/playback unit 106 so as to record the data that was encoded as one piece of moving image data in this way as one moving image file. At this time, the control unit 102 instructs the recording/playback unit 106 to record the joined moving image data in the high-speed writing mode. In this way, multiple moving image files that were recorded in the normal writing mode in the interval recording mode are joined into one moving image file and recorded in the high-speed writing mode. Since there is one moving image file after joining and there is a high possibility that its size will be larger than one AU, even if that moving image file is recorded in the high-speed writing mode, there is a very large reduction in the number of wasted clusters compared to the state in FIG. 4A.

In this way, in the digital camera of the present embodiment that has multiple writing modes with different units of recording to the recording medium, moving image data obtained in each instance of shooting in the interval recording mode is recorded to the recording medium as a separate file in the writing mode having the smallest recording unit. In the interval recording mode, the length of moving image data obtained in one instance of shooting is comparatively short, and an interval period is set from when one instance of shooting and recording is finished until the next instance of shooting starts. For this reason, even if recording is performed in the normal writing mode, writing can be finished before the end of the interval period, and there is no loss of moving image data. In this way, by recording moving image data in the writing mode having the smallest recording unit in the interval recording mode, it is possible to reduce the amount of wasted area in the recording medium compared to the case of performing recording in the high-speed writing mode.

On the other hand, in the normal recording mode, the recording time is undetermined unlike in the interval recording mode, and the amount of standby time until the next instance of recording is also undetermined, and therefore moving image data that was captured at 30 frames/second needs to be recorded continuously and swiftly. Accordingly, moving image data obtained by shooting in the normal recording mode is written to the recording medium in the high-speed writing mode.

Note that in the present embodiment, the supply of power to some constituent elements such as the imaging unit and the signal processing unit is stopped in the interval period. Alternatively, the control unit 102 may set a time for switching on the power next in the internal timer, and then switch off the power of the digital camera 100. In this case, the supply of power to the timer is continued in the powered off period, and then when the set time has been reached, a startup instruction is input from the timer to the CPU in the control unit 102.

Second Embodiment

Next, a second embodiment of the present invention will be described. In the present embodiment as well, the configuration and basic operations of the digital camera 100 are similar to first embodiment, and redundant descriptions thereof will be omitted. In the present embodiment, the time of one instance of recording (shooting) in the interval recording mode can be set by the user via the operation unit 103 from among multiple candidates that have been prepared in advance. For example, the user can select and set one of 0.5 seconds, 1 second, 5 seconds, and 10 seconds, which were prepared as candidate recording times. The control unit 102 stores information indicating the set recording time in the memory 105. A characteristic of the present embodiment is that in the interval recording mode, either the normal writing mode or the high-speed writing mode is set according to the length of the recording time for one instance set by the user.

Figure 5A:
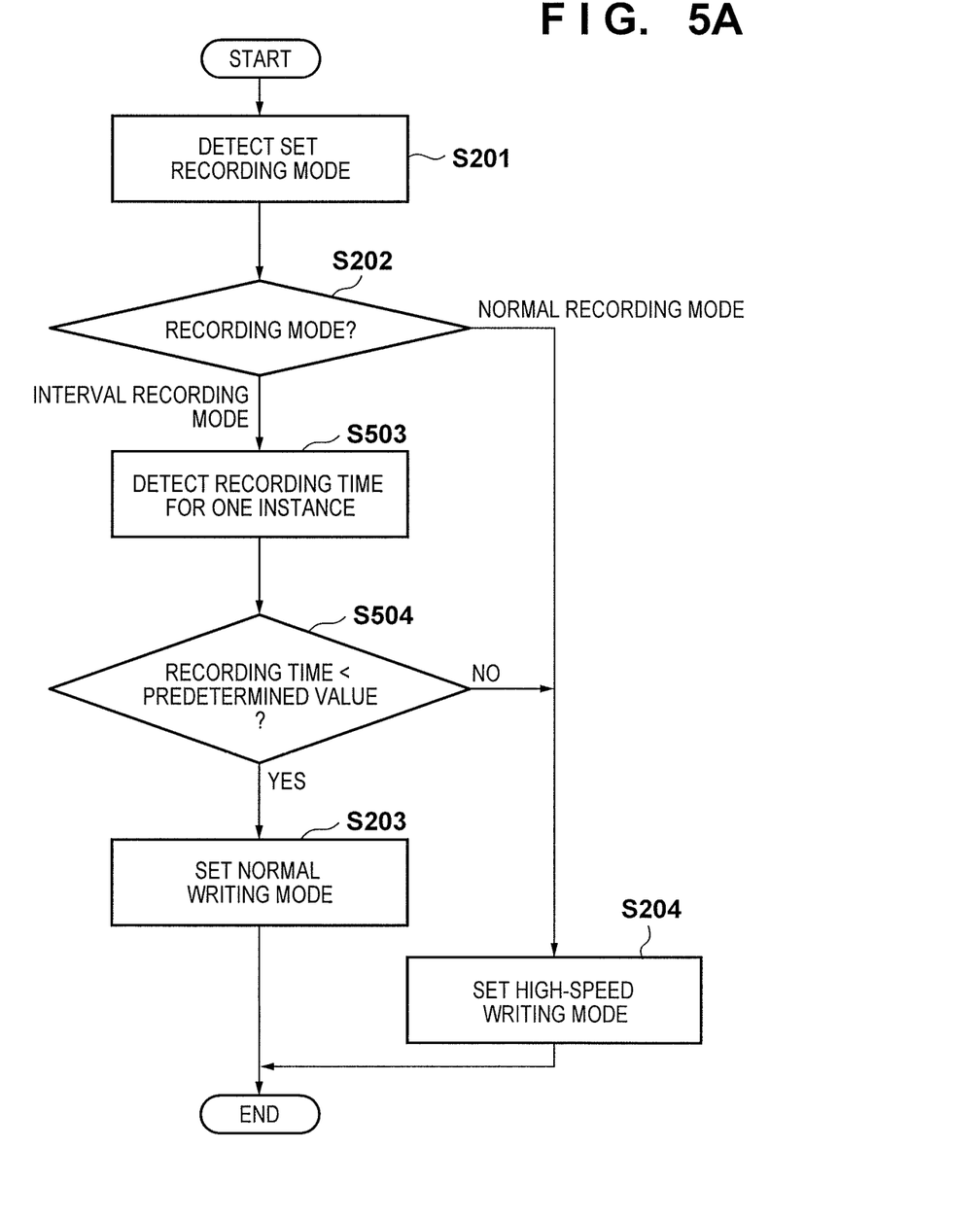
FIGS. 5A and 5B are flowcharts showing writing mode setting processing according to a second embodiment.

FIG. 5A is a flowchart showing writing mode setting processing according to the second embodiment, and steps for performing the same operations as in FIG. 2 are denoted by the same reference numbers and will not be described redundantly. The processing up to the setting of the normal recording mode is the same as in the first embodiment. If the interval recording mode has been set, the control unit 102 of the present embodiment detects the recording time (shooting time) for one instance set by the user by referencing the memory 105 (step S503). The control unit 102 then determines whether or not the recording time is lower (shorter) than a predetermined value set in advance (step S504). The predetermined value is 2 seconds in the present embodiment.

If the set recording time is lower than the predetermined value, the control unit 102 sets the normal writing mode as the mode for writing data to the recording medium 108 (step S203). Also, if the set recording time is higher than or equal to the predetermined value, or if it was determined in step S202 that the normal recording mode has been set, the control unit 102 sets the high-speed writing mode as the mode for writing data to the recording medium 108 (step S204).

In this way, in the present embodiment, instead of immediately setting the normal writing mode if the interval recording mode has been set, the normal writing mode is set if the condition that the recording time for one instance is lower than the predetermined value is satisfied. If the recording time for one instance is short, the amount of moving image data recorded in one instance of recording is also low, and is often smaller than the size of one AU. For this reason, writing data in the normal writing mode makes it possible to reduce the amount of wasted recording area in the recording medium 108 similarly to the first embodiment.

On the other hand, if the recording time for one instance is long, there is the risk that when moving image data obtained in one instance of shooting is being written to the recording medium 108 in the normal writing mode, the interval period will end and the next instance of shooting will start before the writing is finished. In view of this, it is possible for the maximum recording time for which data writing can be finished in the normal writing mode to be obtained statistically for each interval period in advance, and for the predetermined value to be set based on the recording time. The predetermined value may be the maximum recording time itself, or may be approximately 90% of the maximum recording time in order to obtain a margin. In this way, in the interval recording mode, the normal writing mode is set if it is determined that the writing of a predetermined recording time worth of moving image data that is to be recorded in one instance of recording will be finished within the interval period when using the normal writing mode. On the other hand, the high-speed writing mode is set if it is determined that this writing will not be finished within the interval period when using the normal writing mode. Accordingly, moving image data obtained by shooting in the interval recording mode can be reliably recorded.

Figure 5B:
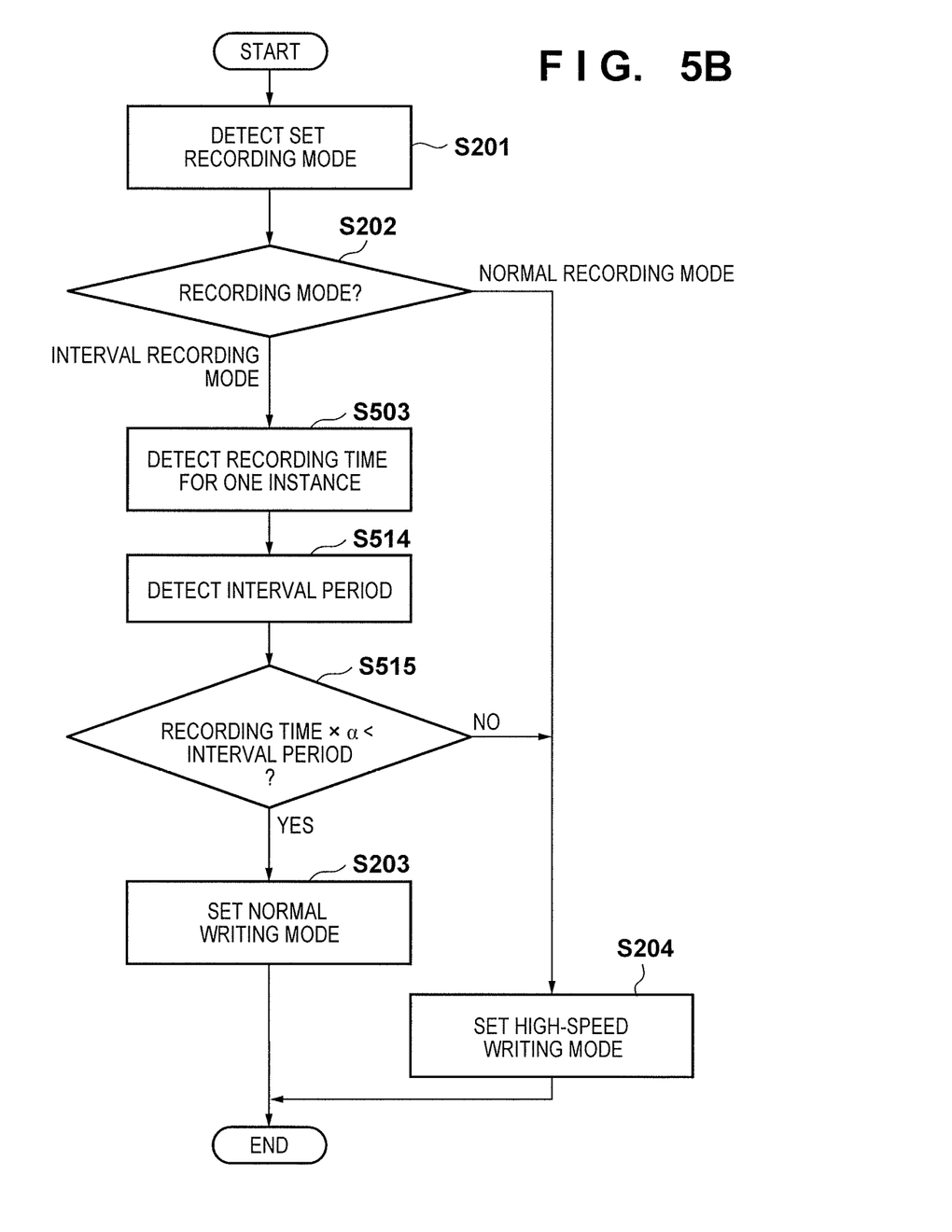

FIG. 5B is a flowchart showing another example of writing mode setting processing according to the present embodiment, and steps for performing the same operations as in FIG. 2 are denoted by the same reference numbers and will not be described redundantly. The processing up to the setting of the normal recording mode is the same as in the first embodiment. Also, similarly to FIG. 5A, if the interval recording mode has been set, the recording time for one instance that was set by the user is detected (step S503).

In this example, the control unit 102 furthermore detects the interval period by referencing the memory 105 (step S514). The interval period may be fixed, or the user may be allowed to set it with a method similar to the method of setting the recording time. The control unit 102 then determines whether or not the product of the recording time and a predetermined coefficient α is lower than the interval period (step S515).

If the product of the recording time and the predetermined coefficient α is lower than the interval period, the control unit 102 sets the normal writing mode as the mode for writing data to the recording medium 108 (step S203). Also, if the product of the recording time and the predetermined coefficient α is higher than or equal to the interval period, or the determination result of step S202 is the normal recording mode, the control unit 102 sets the high-speed writing mode as the mode for writing data to the recording medium 108 (step S204).

For example, if α is 5, the recording time is 0.5 seconds, and the interval period has been set to 5 seconds, then (recording time (0.5 seconds)×5<interval period (5 seconds)), and therefore the normal writing mode is set. Note that although it is assumed that the coefficient α is a value greater than 1, it may be set appropriately based on the amount of moving image data that can be stored in the memory 105 (buffer capacity), the data rate of the moving image data that is to be recorded, and the like.

The present embodiment obtains the effects of the first embodiment, and additionally, by setting the writing mode in a more detailed manner, makes it possible to more reliably carry out the recording of moving image data obtained by shooting in the interval recording mode. Also, by allowing the user to set the recording time and the interval period, it is possible to provide interval recording that is more user-friendly.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments.

This application claims the benefit of Japanese Patent Application No. 2013-158273, filed on Jul. 30, 2013, which is hereby incorporated by reference herein its entirety.

What is claimed is:

1. A recording apparatus having a CPU and a memory, comprising:
   a recording unit that records moving image data to a recording medium having a plurality of clusters; and
   a control unit configured to select one of a first writing mode and a second writing mode, wherein in the first writing mode, data is written into the recording medium in a first writing unit corresponding to a single cluster of the plurality of clusters, and in the second writing mode data is written into the recording medium in a second writing unit corresponding to two or more continuous clusters of the plurality of clusters, and the control unit further configured to control the recording unit so as to write the moving image data to the recording medium in accordance with the selected writing mode; and
   a mode setting unit configured to set one of a plurality of moving image recording modes including
      (i) a normal moving image recording mode in which recording of moving image data is started in accordance with a recording start instruction and is stopped in accordance with a recording stop instruction; and
      (ii) an interval moving image recording mode in which a predetermined recording time worth of moving image data is repeatedly recorded each time a predetermined interval period elapses;
   wherein the control unit:
   selects one of the first writing mode and the second writing mode in accordance with the moving image recording mode set by the mode setting unit such that the first writing mode is selected in the interval moving image recording mode and the second writing mode is selected in the normal moving image recording mode, and
   controls the recording unit so as to record moving image data to the recording medium in accordance with the first writing mode in the interval moving image recording mode and to record moving image data to the recording medium in accordance with the second writing mode in the normal recording mode, and
   wherein at least one of the recording unit, the control unit and the mode setting unit is implemented by the CPU using the memory.

2. The recording apparatus according to claim 1, wherein in the interval moving image recording mode, the control unit selects the first writing mode if the predetermined recording time is shorter than a predetermined value set in advance, and selects the second writing mode if the predetermined recording time is longer than or equal to the predetermined value set in advance.

3. The recording apparatus according to claim 1, wherein in the interval moving image recording mode, the control unit selects the first writing mode if it is determined that writing of the predetermined recording time worth of moving image data will be finished within the interval period when using the first writing mode, and selects the second writing mode if it is determined that writing of the predetermined recording time worth of moving image data will not be finished within the interval period when using the first writing mode.

4. The recording apparatus according to claim 1, wherein in the interval moving image recording mode, the control unit selects the first writing mode if the product of the recording time and a predetermined coefficient α (α>1) is lower than the interval period, and selects the second writing mode if the product of the recording time and the predetermined coefficient α is higher than or equal to the interval period.

5. The recording apparatus according to claim 1, wherein the data recorded on the recording medium is managed per cluster.

6. The recording apparatus according to claim 1, wherein each of the plurality of clusters is the same size.

7. The recording apparatus according to claim 1, wherein the predetermined recording time worth of moving image data is recorded in accordance with the first writing mode in the interval moving image recording mode.

8. A recording method comprising:
   controlling a recording operation of moving image data to a recording medium having a plurality of clusters according to a writing mode selected from among a first writing mode and a second writing mode, wherein in the first writing mode, data is written into the recording medium in a first writing unit corresponding to a single cluster of the plurality of clusters, and in the second writing mode, data is written into the recording medium in a second writing unit corresponding to two or more continuous clusters of the plurality of clusters; and setting one of a plurality of moving image recording modes including (i) a normal moving image recording mode in which recording of moving image data is started in accordance with a recording start instruction and is stopped in accordance with a recording stop instruction and (ii) an interval moving image recording mode in which a predetermined recording time worth of moving image data is repeatedly recorded each time a predetermined interval period elapses, wherein the controlling comprises, selecting one of the first writing mode and the second writing mode in accordance with the moving image recording mode set in the setting step such that the first writing mode is selected in the interval moving image recording mode and the second writing mode is selected in the normal moving image recording mode, and controlling the recording operation so as to record moving image data to the recording medium in accordance with the first writing mode in the interval moving image recording mode and to record moving image data to the recording medium in accordance with the second writing mode in the normal recording mode.

9. A non-transitory computer-readable storage medium storing a program for causing a computer to function as a recording apparatus comprising:

a recording unit that records moving image data to a recording medium having a plurality of clusters; and a control unit configured to select one of a first writing mode and a second writing mode, wherein in the first writing mode, data is written into the recording medium in a first writing unit corresponding to a single cluster of the plurality of clusters, and in the second writing mode, data is written into the recording medium in a second writing unit corresponding to two or more continuous clusters of the plurality of clusters, and the control unit further configured to control the recording unit so as to write the moving image data to the recording medium in accordance with the selected writing mode; and a mode setting unit configured to set one of a plurality of moving image recording modes including (i) a normal moving image recording mode in which recording of moving image data is started in accordance with a recording start instruction and is stopped in accordance with a recording stop instruction and (ii) an interval moving image recording mode in which a predetermined recording time worth of moving image data is repeatedly recorded each time a predetermined interval period elapses, wherein the control unit:

selects one of the first writing mode and the second writing mode in accordance with the moving image recording mode set by the mode setting unit such that the first writing mode is selected in the interval moving image recording mode and the second writing mode is selected in the normal moving image recording mode, and controls the recording unit so as to record moving image data to the recording medium in accordance with the first writing mode in the interval moving image recording mode and to record moving image data to the recording medium in accordance with the second writing mode in the normal recording mode.

* * * * *